United States Patent [19]

Carley

[11] Patent Number: 4,532,169
[45] Date of Patent: Jul. 30, 1985

[54] HIGH PERFORMANCE FIBER RIBBON PRODUCT, HIGH STRENGTH HYBRID COMPOSITES AND METHODS OF PRODUCING AND USING SAME

[75] Inventor: Earl P. Carley, Upper Burrell, Pa.

[73] Assignee: PPG Industries, Inc., Pittsburgh, Pa.

[21] Appl. No.: 308,216

[22] Filed: Oct. 5, 1981

[51] Int. Cl.$^3$ .......................... B32B 5/08; B32B 5/10; B32B 5/12; B65H 81/02; D04H 5/04
[52] U.S. Cl. .................................... 428/109; 156/161; 156/162; 156/171; 156/173; 156/176; 156/177; 156/178; 156/179; 156/307.1; 156/245; 264/108; 264/137; 264/258; 428/112; 428/113; 428/212; 428/215; 428/219; 428/284; 428/285; 428/286; 428/287; 428/288; 428/302; 428/337; 428/339; 428/340; 428/902
[58] Field of Search ............... 428/212, 288, 302, 337, 428/339, 902, 284, 285–286, 287, 340, 294; 156/161, 162, 171, 173, 176, 177, 178, 179, 245, 307.1; 264/108, 137, 258

[56] References Cited

U.S. PATENT DOCUMENTS

| 1,211,443 | 1/1917 | Heany . | |
|---|---|---|---|
| 1,270,250 | 6/1918 | Schenkelberger . | |
| 2,456,922 | 12/1948 | Cogovan . | |
| 2,574,221 | 11/1951 | Modigilani . | |
| 2,626,883 | 1/1953 | Boese . | |
| 2,738,298 | 3/1956 | David et al. . | |
| 2,803,576 | 8/1957 | Donaldson . | |
| 3,108,028 | 10/1963 | Sprunck et al. | 156/178 |
| 3,113,061 | 12/1963 | Donaldson | 156/167 |
| 3,244,570 | 4/1966 | Boggs | 156/178 |
| 3,391,048 | 7/1968 | Dyer et al. . | |
| 3,476,635 | 11/1969 | Heh . | |
| 3,598,689 | 8/1971 | Feffer et al. . | |
| 3,607,599 | 9/1971 | McPherson . | |

(List continued on next page.)

OTHER PUBLICATIONS

"Stampable Carbon Fiber Reinforced Engineering Thermoplastics" by G. J. Taylor, Union Carbide Corporation, Carbon Products Division.

"The 1980's—Payoff Decade for Advanced Materials", 25th National Sampe Symposium and Exhibition, vol. 25, Society for the Advancement of Material and Process Engineering.

"Pultruded Hybrid Composites", by James E. O'Connor and Stephen A. Roosz, for Lord Kinematics.

"Hybrid Carbon Glass Driveshafts, an Idea Whose Time Has Come", by Howard S. Kliger of Celeanese Research Co., and Derek N. Yates of Merlin Technologies, Inc.

Modern Plastics Encyclopedia, 1980–1981, pp. 184–190.
Modern Plastics Encyclopedia, 1979–1980, pp. 173–174, 182 and 184.
Modern Plastics Encyclopedia, 1977–1978, p. 180.

Primary Examiner—James C. Cannon
Attorney, Agent, or Firm—Kenneth J. Stachel

[57] ABSTRACT

The method of the present invention produces a tape of high performance reinforcing fibers having improved alignment between the fibers and improved maintenance of that alignment in processing and molding applications. The method involves contacting one or more of the continuous high performance reinforcing fibers with a polymer impregnated mat. The polymer is compatible with any polymeric material used in the subsequent processing or molding applications. The contacting is performed with the high performance fibers under tension, and the tension is removed when the fibers are properly aligned into a tape in contact with the impregnated mat. The tape material can be used with various molding compounds such as sheet molding compounds and high reinforcement content molding compounds and thermoplastic molding materials wherein the molding compound is contacted with the tape product. The contacting can be performed during formation of the molding compound or the tape material can be applied to an already formed molding compound during compression molding.

52 Claims, 8 Drawing Figures

U.S. PATENT DOCUMENTS

| | | | |
|---|---|---|---|
| 3,660,197 | 2/1972 | Morgan et al. | 156/280 |
| 3,700,511 | 10/1972 | Whitney et al. | 156/60 |
| 3,700,527 | 10/1972 | Grosh | 156/426 |
| 3,700,535 | 10/1972 | McCoy et al. | |
| 3,755,060 | 8/1973 | Bullock | |
| 3,759,353 | 9/1973 | Marin | 188/71.5 |
| 3,776,808 | 12/1973 | Montgomery | |
| 3,784,428 | 1/1974 | Willats et al. | 156/174 |
| 3,822,157 | 7/1974 | Lee | 156/85 |
| 3,846,205 | 11/1974 | Yazawa | 156/291 |
| 3,859,160 | 1/1975 | Marin | |
| 3,940,302 | 2/1976 | Matthews et al. | 156/167 |
| 3,953,641 | 4/1976 | Marquis | 428/195 |
| 3,966,864 | 6/1976 | Stenzenberger | 264/137 |
| 3,971,669 | 7/1976 | Wrzesien et al. | 156/181 |
| 3,994,762 | 11/1976 | Wrzesien et al. | 156/148 |
| 4,016,022 | 4/1977 | Browning et al. | 156/285 |
| 4,065,340 | 12/1977 | Dickerson | 156/154 |
| 4,065,592 | 12/1977 | McAllister | 428/92 |
| 4,065,593 | 12/1977 | Peterson | 428/92 |
| 4,065,597 | 12/1977 | Gillespie | 428/285 |
| 4,135,029 | 1/1979 | Pfeffer | 428/284 |
| 4,167,429 | 9/1979 | Ackley | 156/174 |
| 4,182,495 | 1/1980 | Borgmeier et al. | 239/265.11 |
| 4,211,818 | 7/1980 | Ackley | 428/367 |
| 4,220,496 | 9/1980 | Carley et al. | 156/174 |
| 4,220,497 | 9/1980 | Carley | 156/174 |

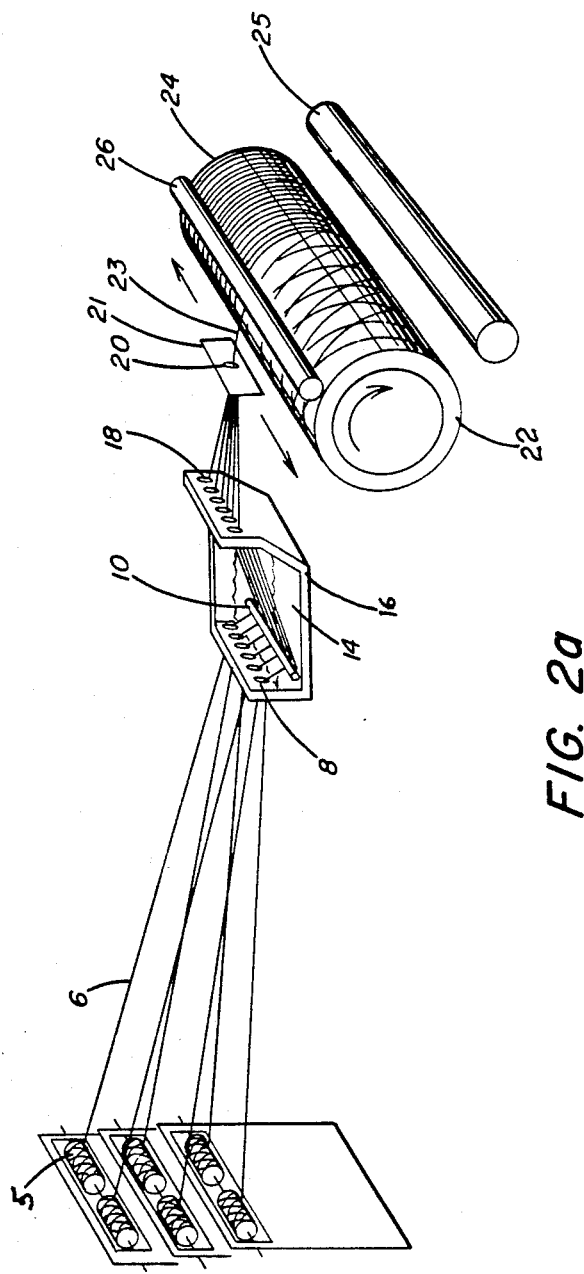
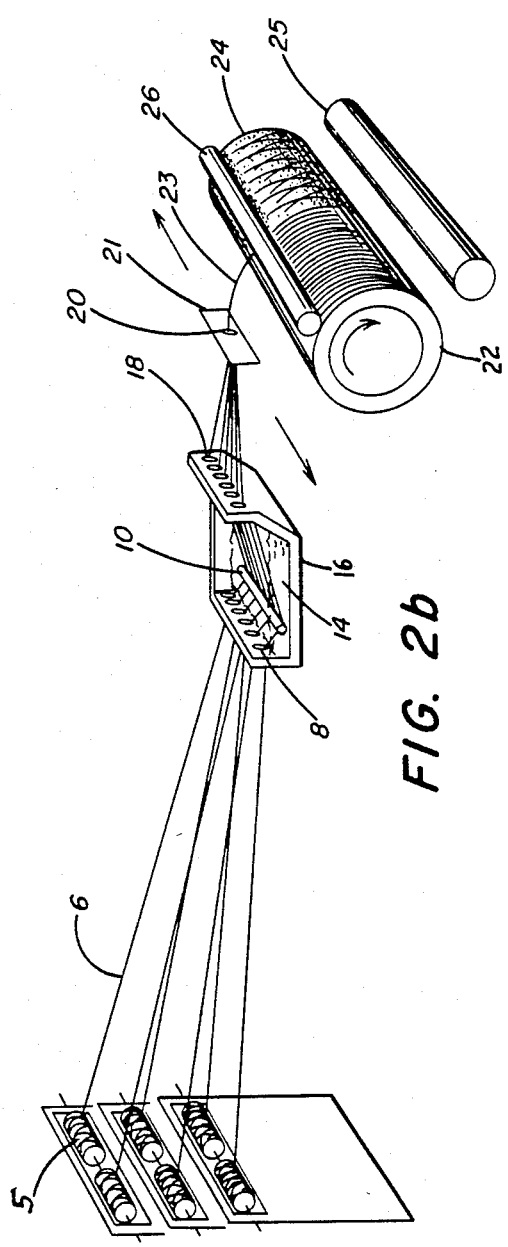

HIGH PERFORMANCE FIBER RIBBON PRODUCT, HIGH STRENGTH HYBRID COMPOSITES AND METHODS OF PRODUCING AND USING SAME

The present invention is directed to a method of forming a filamentary tape or woven product having high performance fibers or strands and said products having controlled alignment of the fibers or strands, wherein the controlled alignment is maintained when the products are used in molding applications. Another aspect of the invention is directed to the method of forming the tape or woven product and the products themselves in conjunction with the production of high strength hybrid composites formed by filament winding.

High performance fibers such as aramid, boron or carbon fibers have either an elastic modulus or impact strength greater than the elastic modulus or impact strength of commonly used reinforcements such as glass fiber strands. These high performance fibers have been used as fiberous reinforcements for polymeric material alone and in combination with each other and in combination with glass fiber strands.

The high performance fibers are available in packages of fiberous bundles and also as pre-impregnated tapes or woven products. These preimpregnated tapes, commonly referred to as pre-preg tapes, are plies of textile material usually containing a partially cured resin. Such a prepreg material is prepared from bundles of continuous high modulus or high impact strength fibers or precursor textile fibers by combining these fibers in layers with sheets of polymeric material. In making pre-preg tapes of continuous high performance fibers, the fibers are ordinarily oriented in the longitudinal direction of the sheet. Maintenance of this orientation during processing is not without difficulty for the high performance fibers. For instance, in preparing a pre-preg of carbon fibers, where continuous parallel bundles (tow) of carbon fibers are wound uniformly on a frame to produce a uni-directional fiber sheet, the fibers in such a bundle are nominally uni-directional, but there is inevitably some degree of misalignment and this limits the width to which a bundle can be spread conveniently to give a uniform sheet.

This problem is assuaged to some degree by preparing a sheet of fibers from precursor textile fibers of carbon fibers in a batch or continuous process. This method of preparation takes advantage of the greater tolerance of the textile fibers to deformation compared with that of fully processed carbon fibers. Such a process utilizes cross-stitching of the textile fibers to hold them together after removal from the oxidation zone and during subsequent processing. In this manner, a uni-directional carbon fiber sheet is produced which can be impregnated uniformly with a controlled quantity of a suitable resin. The continuous process involves preparing a textile sheet of the required thickness from a suitable number of parallel textile tows and then passing the continuous textile sheet through the various stages of heat treatment, maintaining alignment of the parallel fibers in a sheet structure through the complete process. Impregnation with a suitable resin is then carried out as a final step.

In addition to the use of cross-stitching to maintain alignment of high performance fibers in producing pre-preg tape products, other techniques have also been employed. Another technique is the use of a release-type paper with an amount of resin present on one surface of the paper. The resin containing surface of the paper is then contacted with a plurality of parallel fibers and the parallel alignment is maintained to a degree during the subsequent processing. Another technique is to utilize the resin alone and contact the fibers with the resin to maintain alignment in subsequent processing.

The pre-preg tape or a woven product of high modulus fibers has various applications. Such applications may require that the alignment of the high performance fibers be maintained not only during processing of the pre-preg tape or woven product, but also in the molding of any material utilizing these materials. Maintainence of the alignment of the fibers in the pre-preg tape or even in woven products during processing and during molding maximizes the derived benefits and translates into the best physical properties from the use of such a premium high performance fiber. Maximizing benefits and obtaining the best physical properties for the high performance fibers are important objectives because of the usage demands placed on the fibers and of the cost of the fibers.

Examples of applications of high performance fibers, where alignment of fibers is an important factor, are reinforced polymeric materials having more rigid and stronger impact qualities than glass fiber reinforced polymeric materials and production of solar collectors.

In polymeric reinforcement, high performance fibers can be used alone or as hybrids in combination with general reinforcing fibers such as glass fibers. A reinforced polymeric material having a single matrix reinforced with two or more fiberous reinforcements is referred to as a hybrid composite. One of the most important reasons for using hybrids is to reduce the cost of the hybrid composite by selective use of the high performance fibers. The hybrid composites consist of various combinations of glass fibers, carbon fibers, and/or aramid fibers. The selective use of the high performance fibers may involve the use of a composite strand as that shown in U.S. Pat. No. 4,211,818 (Ackley) or the use of glass reinforcing fibers and carbon fibers as a veil mat in sheet molding compounds for compression molding. The carbon fiber additions to the glass fibers enhance dimensional stability, provide electrical conductivity, increase stiffness and increase strength. One form of carbon fiber, glass fiber composite, that is disclosed in Modern Plastics Encyclopedia, 54, 10a, page 180, October, 1977, "Hybrids", by D. C. Hiler, is a thin carbon veil mat molded into the surface of sheet molding compound to provide a means to mold in an electrically conducted surface that enhances electrostatic paintability of plastic parts without the need for a conductive primer. Hybrid composites also are useful in the area of high glass fiber strand content composites. For example, recent composite development such as XMC ® and HMC ® composites developed by PPG Industries, Inc., can utilize high performance fibers such as carbon fibers and aramid fibers. An XMC ® composite can be processed in hybrid form utilizing glass and carbon fibers; and it can be molded in matched metal molds to provide uniquely high tensile strength and modulus in one direction of the composite. Also, a hybrid HMC ® composite of glass and carbon fibers provides a high strength, high stiffness, dimensionally stable composite with excellent flow characteristics and the ability to form bosses and ribs.

Another area of technology, where the alignment of the high performance fiber of carbon fibers is important, is in the production of solar collectors. In this application, as shown in U.S. Pat. No. 4,065,593 (Peterson), the absorber surface is comprised of a plurality of free ends of carbon or metallic fibers. The fibers forming the absorber surface are straight and are aligned in parallel and side-by-side relationship. The small diameters of the fibers along with the very close spacing of adjacent fibers of from about 1 to about 10 micrometers provides a trap for solar energy. In this application, two alignment parameters are critical. These are the longitudinal orientation of the strand and the spacing between the strands. Proper alignment of the fibers is achieved by such methods as pultrusion and filament winding. In pultrusion and filament winding, the fibers are contacted with a thermoplastic or thermosetting resin. Preparation of composites by pultrusion and filament winding result in fibers, which are substantially straight and aligned in a parallel and spaced, side-by-side relationship. After cutting of the solar absorber sections, the matrix surrounding the fibers is removed from at least one end of the composite.

It would be useful to have a layer of high performance fibers on the surface of molding compounds such as sheet molding compound, and the high glass content molding compounds such as HMC® and XMC® composites. Such a surface layer would have high performance fibers in side-by-side relationship.

It would also be an advance in the art to be able to more effectively use high performance fiber tape products with other fiberous reinforcement in molding of fiber reinforced polymers.

A problem arises in producing such a surface or tape product when the side-by-side, unidirectional high performance reinforcing fibers have undesired gaps in the side-by-side array. These gaps or spaces could result in reduced physical properties. In addition, a reduction in physical properties also can occur if the high performance fibers in the side-by-side, unidirectional oriented array lack a high degree of unidirectional orientation. With the use of the premium high performance reinforcing fibers, it is advantageous to obtain the highest physical properties possible because of the high costs of these materials. Another problem that arises from the use of the high performance reinforcing fibers on a surface of a composite, especially for carbon fibers, is the problem of abrasion. Having the carbon fibers on the surface of the composite would subject them to possible nicks, thereby causing abrasions and reducing the effectiveness of the carbon fibers. Another problem peculiar to the use of carbon fibers is their electrical conductivity. Where electrical conductivity is desired, there isn't a problem, but if the use of carbon fiber on the surface of a composite gives electrical conductivity, where it is not desirable to have electrical conductivity, this would pose a problem.

It is an object of the present invention to provide a tape of high performance reinforcing fibers having improved unidirectional orientation, and/or improved controlled spacing between the fibers, and/or ease of use in molding composites with glass fibers and particularly for use in hybrid composites.

It is a further object of the present invention to provide a method of preparing a tape of high performance reinforcing fibers that have the aforementioned advantages and utility.

It is another additional object of the present invention to provide hybrid composites having surfaces of high performance reinforcing fibers with improved unidirectional orientation, and/or improved abrasion resistance, and/or reduced electrical conductivity, and/or improved surface properties.

It is a further additional object of the present invention to provide a method for preparing the hybrid composites having the aforementioned advantages and utilities and a method of using a tape of high performance fibers in molding of fiber reinforced products.

SUMMARY OF THE INVENTION

The aforementioned objects of the present invention and other objects eclectically gleaned from the following disclosure are achieved by the methods and articles of the present invention.

In its broadest aspects, the method of the present invention is for preparing a tape of aligned continuous high performance reinforcing fibers. This method involves preparing a mat of fibers having a lower performance parameter than the high performance reinforcing fibers, impregnating the mat with an effective amount of a matrix compatible polymer; and, contacting more than one length of the continuous high performance reinforcing fibers under tension with the impregnated mat, and releasing the tension to yield the resulting tape product.

The formation of one or more lengths of high performance reinforcing fibers under tension is performed by winding, wrapping, pulling, stretching or otherwise disposing the high performance fibers to develop an effective tension in each length of the high performance fibers. The effective tension is that required to align and or orient each length of high performance fiber in any desired arrangement. Such a tension can be developed by conventional preimpregnation (preprag) techniques or by reciprocatingly winding one or more continuous high performance fibers, having a substantial portion of their surfaces coated with a matrix compatible polymer, onto a rotating mandrel, having a polymeric film on the surface of the mandrel.

The impregnated mat can be contacted with this arrangement of high performance fibers or this arrangement or layer of high performance fibers can be cut from the surface of the mandrel and have tension applied to the layer. The tensioned layer is contacted with the impregnated mat.

The tape product by this method has improved unidirectional alignment of the continuous high performance reinforcing fibers so as to maximize the physical properties of the tape by fully utilizing the high performance reinforcing fibers. This improved alignment is maintained even when the tape is used in conjunction with the molding of reinforced polymeric materials.

The term "unidirectionally aligned" refers to the alignment direction in one layer of the high performance reinforcing continuous fibers. The directions of subsequent layers may be different from previous layers.

An improved method of molding utilizing the unidirectionally aligned high performance fiberous tape involves selectively combining various dimensioned segments of the tape in a compression mold with conventional thermoplastic or thermosetting polymeric molding material which is unreinforced or reinforced with conventional lower performance parameter fibers like glass fibers.

A narrower aspect of the present invention is a method of producing fiber reinforced polymeric materials having one or more exterior surfaces comprised of unidirectionally, aligned, continuous high performance reinforcing fibers. The method involves preparing the impregnated mat and contacting it with a first surface of one or more layers of continuous high performance reinforcing fibers under tension as aforedescribed, combining the second surface of the one or more layers of continuous high performance reinforcing fibers, with one or more layers of continuous or chopped or woven or mixture thereof of lower performance reinforcing fibers impregnated with a matrix polymer in the form of a molding compound. The molding compound can be sheet molding compound, or high glass content molding compound such as HMC ® composite or XMC ® composite. The product produced by this method has increased strength and stiffness due to the surface layer of continuous unidirectionally, aligned high performance reinforcing fibers and has abrasion resistance due to the mat covering the surface of the high performance reinforcing fiber layer, and has basic strength from the sheet molding compound, HMC ® composite or XMC ® composite.

Many variations are possible in both the broad, intermediate, and narrow aspects of the present invention. For instance, in the broad aspect of the invention, both sides of the tape may be covered with the thin mat and the high performance reinforcing continuous fibers in the tape may be aligned in any fashion ranging from side-by-side, abutting, parallel arrangement to open helically spaced arrangement. The method also provides a means for controlling the spacing between the fibers by properly aligning the fibers before the fibers are contacted with the mat so that the alignment is maintained through processing and subsequent use, such as molding. Another variation includes impregnating the thin mat during formation of the tape rather than pre-impregnating the mat. Further modifications of both the broadest aspect and the narrower aspect of the invention are more fully elaborated upon in the detailed description of the invention.

BRIEF DESCRIPTION OF THE DRAWINGS

FIG. 2a is the same schematic view as FIG. 2 but the product produced is a helically wound high performance fiber product. FIG. 2b is the same schematic view as FIG. 2 except that, as in FIG. 2a, the stand for the resin bath and the housing for the strand traveling guide and mandrel, and supply roll, are not shown, but the product produced is a tape with high performance fiber spaced one from another.

FIG. 3b depicts the improved unidirectional parallel alignment of the high performance reinforcing fibers produced by the method of FIG. 2.

DETAILED DESCRIPTION OF THE INVENTION

Figure 1:
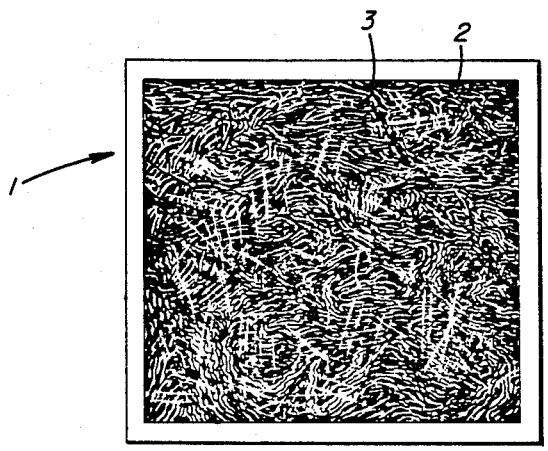
FIG. 1 is a top view of a mat of continuous monofilaments useful as the mat of the present invention.

In the discussion of the process and product of the present invention, it is helpful that certain terms are defined. The number of these terms are defined in U.S. Pat. No. 4,220,497 which is hereby incorporated by reference. These terms include mandrel, band or ribbon, band or ribbon width, circuit, pattern, layer, ply, crossovers, and helix angle alpha, and winding angle beta. In addition to these terms, the following terms have the following definitions:

"High performance fibers"—means fibers having a modulus of elasticity in tensions of at least 2,000 hectobars, and/or tensile strength of more than $375 \times 10^2$ pounds/square inch ($26.43 \times 10^2$ kg/cm$^2$). Nonexclusive examples of these fibers are graphite fibers which can be produced from any known precursor such as rayon, cellulose, polyacrylonitrile (PAN), and pitch from coal tar or a hydrocarbon source and from any known process such as batch or continuous pyrolysis. Although the term "fiber" is used for high performance fibers, it is contemplated that this term include bundle of fibers and strands and as for carbon and/or graphite fibers, include bundles of fibrils, conventionally referred to as a filament. The carbon and/or graphite filament of around, for example, 7 micrometers, is comprised of some 100 or more fibrils arranged like the wires in a multistrand cable closely packed together with the interstitial spaces filled with amorphous carbon.

"The mat to be impregnated" can be comprised of continuous monofilaments, paper-like mat product, like glass paper produced from chopped glass fiber strands, fine filament multi-filament strand mat, and chopped glass fiber strand mat of long length chopped glass fiber strands. The mat to be impregnated for use in the present invention is thin and lightweight. Generally, the mat should not have a thickness greater than about 0.05 inches (1.30 mm.) and should not have a weight greater than one ounce per square foot (0.03 gm./cm$^2$).

"Matrix compatible polymer" refers to thermosetting and thermoplastic polymers that are compatible with the polymers comprising the matrix of any reinforced polymeric material.

"Effective amount of matrix compatible polymer" means an amount of polymer to wet-out both side of the mat to be impregnated. This amount is approximately around 5 weight percent of a continuous monofilament glass fiber mat. Any amount equivalent to this amount for the monofilament mat can be used with other types of mats.

"Reinforcing fiber" refers to fibers, bundles of fibers, strand or strands of material with any values of elastic modulus and tensile strength ranging from lower values than those of the high performance fibers but also including the high performance fibers other than carbon or graphite or fibers with similar rigidity.

It is believed, but the process and product of the present invention are not limited by this belief, that the mat to be impregnated and the matrix compatible polymer impregnating the mat and the tension used in producing the product of high performance fibers synergistically produce the desired benefits of unidirectionally oriented high performance fibers, improved abrasion resistance, electroconductivity shielding, and improved maintenance of unidirectional alignment in molding. It is believed without limiting the invention that this synergistic behavior involves first the tension properly aligning the high performance fibers, with the matrix compatible polymer aiding in aligning the high performance fibers and the mat aiding in maintaining the alignment of the high performance fibers, when the tension is removed.

The invention will now be described generally with reference to the products and processes illustrated in the figures.

FIG. 1 is a top view of a mat of continuous monofilament glass fibers. The mat by its definition can be made of continuous monofilaments, paper-like product formed by dispersing chopped strand in water, drying and combining with a paper binder; or a mat of continuous multifilament strands composed of fine filaments or chopped strand mat.

The mat has fibers having any value of modulus of elasticity ranging up to the higher elastic modulus of the high performance fibers and can be selected from any type of glass fiber, or synthetic fibers such as polyesters, nylons (polyamides), and polyacrylonitriles. The types of glass fibers that can be used can be "E"-glass fibers, "621"-glass fibers, and other boro-silicate type glass fibers, and soda-lime-silica glass fibers, "C"-glass fibers and "S"-glass fibers or any more environmentally acceptable derivatives thereof. The mat can be in any dimensions suitable for operation in the processing equipment subsequently described, and can be formed by any method known to those skilled in the art. In FIG. 1, the border 1, around the mat is present only as a reviewing aid to highlight the mat and does not constitute any structural part of the mat. Numeral 2 depicts the actual boundary of the mat and numeral 3 depicts the continuous monofilament in the mat.

Figure 2:
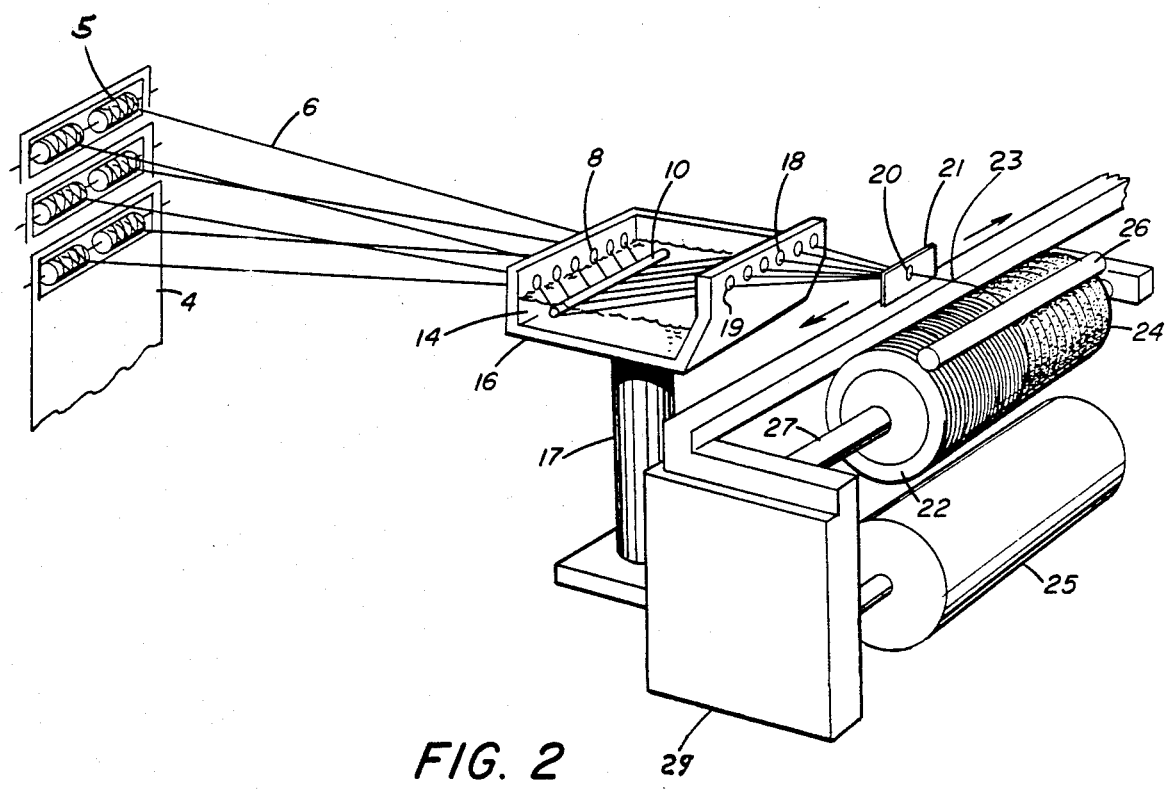
FIG. 2 is a somewhat schematic view in perspective of the apparatus and process for carrying out the process of the present invention to produce a parallel aligned high performance tape product.

In the preparation of high performance reinforcing fiber tape with the impregnated mat facing or surface of the present invention, a plurality of high performance reinforcing fibers or strands can be used. As shown in FIG. 2 for illustrative purposes only, 6 high performance reinforcing fiber packages, numeral 5, are employed. These packages 5 are mounted on a stand or creel, 4 and the high performance reinforcing continuous fiber, preferably carbon fiber, 6, from each of the packages are each threaded through a separate eyelet in eyelet set 8 at one end of the resin tank, 16. The eyelets can be made of any non-abrasive material such as ceramic materials. After the fibers pass through the eyelets in the bath, the fibers are passed under the retaining bar 10, the fibers contact the polymeric resin 14 in resin tank 16 which is supported by support 17. After the strands pass under bar 10, each exits the bath through an individual die, 18, located at the forward end of the resin tank, 16. The polymer resin, 14, in the tank can be any conventional polymer known to those skilled in the art to be used with carbon fibers and not incompatible with the fibers of the mat to be impregnated. Non-exclusive examples include saturated and unsaturated polyesters, like polybutylene terephthalate; polysulfone, polyether sulfone; nylon, polyphenylene sulfide, and polyamide-imide.

The resin tank 16 is shown with one side cut away for a view into the interior of the tank, during the operation the tank is constantly supplied with resin 14 to ensure that sufficient resin is maintained in tank 16 to thoroughly wet the high performance reinforcing fiber strands 6, which are passed through it under bar 10. This can be done continuously by providing an automatic feed inlet and overflow system, or the resin or polymer can be added manually as required. The tank 16 depending on the width of the mandrel 22 can remain stationary or it can be reciprocated in a horizontal plane coordinated with the movement of plate 21.

Although eyelet, 20, gathers the fibers together after the fibers exit the resin tank 16, the fibers could be grouped before or in the resin tank 16. Grouping the fibers during their presence in the resin tank or upon exiting the tank, 16, is preferred for ease of coating the fibers with the resin. The fibers exiting the resin tank, 16, through dies, 18, are fed through guide eyelet, 20, to gather the carbon fibers into a bundle, 23. Eyelet, 20, is located on a traveling guide, 21. Bundle 23 is wound onto a rotating mandrel 22.

An important consideration in preparing the tape product of the present invention is the regulation of the polymer content of the final tape product. In this process, this is accomplished by regulating the size of the orifice in the dies 18. In general, it has been found desirable to maintain these orifices in the range of about 0.014 to about 0.11 inch (0.036–0.28 cm).

The rotating mandrel 22, has its entire peripheral surface covered with a polymeric film, not shown, which can be placed on the mandrel from any known source and in any known manner. The polymeric film is any such film capable of acting in a release capacity for resin or polymeric materials so that these materials can be easily removed from the mandrel. Nonexclusive examples include nylon film, polyolefin film like polyethylene and the like. Also release type chemical agents could be placed on the mandrel with or without the film.

A polymer impregnated mat or preferably a mat to be impregnated with polymer, both illustrated by 24, is placed on top of the polymeric film. Also, this mat in preimpregnated or unimpregnated form may be absent from the mandrel on top of this layer of polymeric film. In this latter case, the high performance reinforcing fibers are wound directly onto the polymeric film and the preimpregnated mat or mat to be impregnated is placed onto the layer of wound high performance reinforcing fibers.

For the polymer impregnated mat, it is preferred that the mat is a glass fiber monofilament mat. Such a mat is available from Reichhold Chemicals, Inc., under the commercial name "Modiglass" mat. Any thickness for such a mat can be used as long as the mat is lightweight and thin but preferably the thickness ranges from 0.010 inches (0.025 cm.) to 0.030 inch (0.076 cm.). This mat can be impregnated with matrix compatible polymer by such nonexclusive examples as spraying, dipping, rolling, or metering of the polymer onto the mat. The polymer impregnated mat is supplied from roll 25 although any other source known to those skilled in the art of using impregnated mat can be used. The polymer impregnated mat is preferably placed on the polymer film on the mandrel before the carbon fiber bundle 23 is wound on top of the polymer impregnated mat. The mandrel 22 also has a roller 26 which is used to roll any additional polymer added to the impregnated mat to give a sufficiently wet mat on which the high performance reinforcing fibers can be wound. Roller 26 can be attached to housing 29 by any method known in the art. When the high performance reinforcing fibers are being wound on the impregnated mat, the roller can be functional or can be moved out of the vicinity.

The impregnated mat can be formed directly on the mandrel by placing the polymeric film on the mandrel from any suitable source. The matrix compatible polymer is placed onto the polymeric film, where the amount of said polymer is an effective amount or less than effective amount where additional polymer is added in a later step. The mat to be impregnated, like Modiglass mat, is then placed on top of the polymer from a roll like roll 25, and rolled into the polymer by roller 26. In an alternative embodiment, roller 26 could be an ordinary hand-held roller and the mat would be rolled into the polymer in this fashion. If less than the effective amount of polymer was added to the polymeric film, additional polymer is then added to the mat and this material is rolled into the mat. This produces the impregnated mat on the polymeric film on the surface of mandrel 22.

Among typical polymers that are useful as matrix compatible polymers, are polyolefins, polyamides, novalacs, polystyrene, vinly esters, epoxies, polyurethanes and polyesters. Typical of heat curing polyester resins that may be employed in this invention are those disclosed in U.S. Pat. No. 3,772,241 to Kroekel; U.S. Pat. No. 3,701,748 (Kroekel); and U.S. Pat. No. 3,840,618 (Defano). Preferred resin materials are thermally cured polyesters, epoxies, and vinyl esters as these materials provide a high strength composite and give reasonable shelf life to the composite prior to their curing during the heat and pressure formation of the composite. Of the aforementioned polymers, the group also includes the thermoplastic polymers such as the polyolefins, particularly polypropylene, polyamides, and polyesters. Any conventional additives customarily used with these polymers as a polymeric system for producing molding compounds like bulk molding compound, sheet molding compound and high glass content molding compounds can also be used.

When the high performance reinforcing fibers are wound on the impregnated mat or the polymeric film on the mandrel, an effective tension is developed for the high performance fiber. This tension on the fiber is chiefly developed between the rotating mandrel 22 and dies 18. The tension is sufficient to hold the high performance reinforcing fibers in alignment during winding.

In the process shown in FIG. 2, the mandrel 22 is rotating preferably in a clockwise direction on a shaft, 27, which is driven by a suitable motor (not shown). The guide plate 21 reciprocates in a horizontal plane and lays the fiber bundle 23 down on the surface of the mandrel 22. The fiber bundle 23 is normally laid on the mandrel right next to the previously wound fiber bundle 23 present on the mandrel surface in a near parallel fashion. The near parallel fashion refers to the fiber bundle touching the previous fiber bundle laid on the mandrel to form a layer on the polymeric film on the surface of the mandrel. This normal operation occurs either before or after the impregnated mat is placed or formed on the polymeric film on the surface of the mandrel. For purposes of this disclosure, a layer is formed when the fiber bundle 23 has covered the mandrel in one traversing direction or half of a traversing cycle. The finished tape or sheet containing the high performance fiber bundles may contain one layer or a number of layers desired to produce a product of desired density in pounds per square foot (grams/cm$^2$).

Also, bundle 23 can be laid on the mandrel by the reciprocating guide plate 21 at a predetermined helix angle or at any predetermined orientation to provide directional reinforcement properties to the finished tape. The helix angle is the included acute angle created by the intersection of the fiber bundle 23 on the body of the mandrel 22 with a line on the body of the mandrel parallel to the longitudinal axis of the mandrel. This angle for structural sheets produced by this process is generally in the range of about 60° to 89°. The wind angle on the mandrel in relation to fiber bundle 23 is the included acute angle created by the intersection of fiber bundle 23 on the body of the mandrel 22 with a line on the body of the mandrel perpendicular to the longitudinal axis of the mandrel. In a typical use of the process, this angle is between 30 to 1 degrees.

FIG. 2a illustrates the process and apparatus of the present invention, where the tape is a helically wound ribbon product. The helically wound product is produced by guide plate 21 reciprocating in a horizontal plane and laying the fiberous bundle 23 down on the surface of mandrel 22 with space between the preceedingly wound bundle. A further description is available from the teachings of U.S. Pat. Nos. 4,220,496 and 4,220,497 hereby incorporated by reference.

In another variation shown in FIG. 2b, the high performance fiber bundle 23 can be laid on the polymeric film or impregnated mat on the mandrel in a pattern to give a desired spacing between the carbon fibers present on the polymer film or impregnated mat on the mandrel surface. This controlled spacing is achieved by regulating the speed of the traversing spacer guide bar 21 as it reciprocates on a horizontal plane to give the desired spacing. In this variation the application of the impregnated mat before or after winding of the high performance reinforcing fiber bundle enables maintainence of the spacing through further processing or molding.

The tape product formed of high performance reinforcing fiber, has a covering of polymeric film placed on it. Thus, in practice, the surface of the mandrel is covered with a polymeric film prior to winding the resin-containing fiberous bundle 23. When the requisite number of layers have been wound onto the mandrel, the mandrel is stopped and if the impregnated mat is not applied to the surface of the polymeric film on the surface of the mandrel, then it is applied to the wound high performance fiberous bundles. Even if the impregnated mat has been added before winding, it can also be added again after winding of the high performance fiberous bundles. Whether or not the impregnated mat is or is not added after winding, the polymeric film is used to cover the tape product and the tape product is cut from the mandrel. By sandwiching the tape product between the polymeric film, the tape product can be handled and stored until used.

In preparing the tape product of high performance reinforcing fibers, it is preferred to use carbon or graphite fibers as high performance fibers. The carbon or graphite fibers are produced by treating organic fibers such as rayon or acrylonitrile by pyrolysis to produce strands of carbon or graphite fibers. Thus, carbon filaments have been produced by pyrolyzing rayon precursor yarns, polyacrylonitriles and the like. Several of these strands are available in the industry today and have been described in the literature. (Modern Plastics Encyclopedia, 54, 10a, pg. 172, October, 1977; Advance Materials, C. C. Carroll-Poczynsky, Chemical Publishing Company, New York, 1962). A particularly useful strand for use in the instant process is a carbon fiber called Celion ® manufactured by Celanese Corporation and Thornel ® manufactured by Union Carbide, most particularly the Thornal ® Type WYP carbon fiber. Another precursor that may be used to produce the carbon fibers is pitch from coal tar or a hydrocarbon source.

The process generally depicted in the drawing is obviously subject to many variables. Thus, while only one bundle of fibers, 23 is shown in the drawing as being wound on mandrel 22, this is solely for illustrative purposes. The mandrel may have separate fibers or many bundles such as bundle 23 wound at the same time on its surface. Similarly, the number of high performance fibers 6 used to form bundle 23 can be varied. Another variation is the use of a composite strand made up of one or more high performance reinforcing continuous fibers with one or more fibers or strands having a lower modulus of elasticity. A nonexclusive example is the composite strand of high performance fibers and glass fiber strand shown in U.S. Pat. No. 4,167,429 (Ackley) hereby incorporated by reference. It is another variation of the process depicted in FIG. 2 to wind one or more bundle of strands 23 onto the polymeric film present on mandrel 22 to obtain one or more layers of parallel abutting continuous high performance fiberous strand across the surface of mandrel 22 and then apply the impregnated mat or form the impregnated mat on the layer of high performance fibers. Another variation is to have the impregnated mat on both sides of the layer of continuous high performance fibers.

Figure 3A:
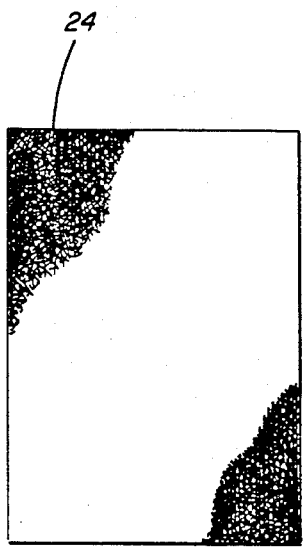
Fig. 3a is a view of the surface of a singled layered tape of high performance reinforcing fibers such as carbon fibers, having the thin mat with matrix compatible polymer contacting the tape.
Figure 3B:
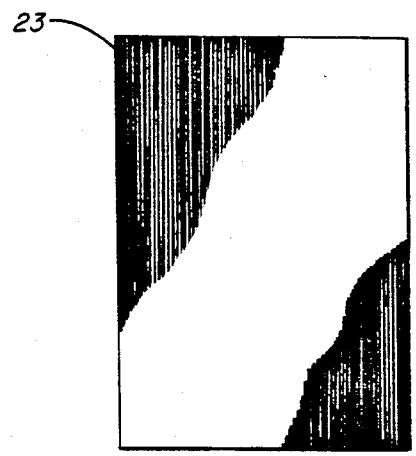
FIG. 3b is a view of a surface opposite the surface of FIG. 3a of the single layered tape of high performance reinforcing fibers such as carbon fibers.

FIGS. 3a and 3b illustrate the parallel strand tape product of the present invention where the carbon fibers are the high performance fibers 23. FIG. 3a shows the surface of the tape product having the impregnated mat 24 which is preferably a continuous monofilament glass fiber mat. The tape product has the cured thermosetting matrix compatible polymer or a hardened thermoplastic matrix compatible polymer in an amount of about 1 to about 20 weight percent of the tape product. The tape product has unidirectionally aligned carbon fibers or other high performance reinforcing fiberous bundles, 23. The weight percent of glass in the product is about 1 to about 35 weight percent and the weight percent of the carbon fibers or other high performance reinforcing continuous fiberous bundles is about 5 to about 85 weight percent. The surface of the tape product not having the impregnated mat, if there is one, is as depicted in FIG. 3b showing the improved parallel alignment of the carbon fibers or other high performance reinforcing continuous fiberous bundles 23, thereby taking full advantage of the properties of the carbon fibers or other high performance continuous reinforcing bundles and translating them into improved properties of the tape product.

FIGS. 3a and b, highlight the utility of the tape product of the present invention in that the impregnated mat contacting the unidirectionally aligned high performance reinforcing fibers, when used in subsequent processing including molding, has the alignment of the high performance reinforcing fibers maintained. The prior art methods of using paper backing on carbon fibers would not maintain the alignment because the paper backing is removed before the carbon fiber product is subsequently used and removal of the paper would decrease the alignment of the carbon fibers or other high performance fibers.

The tape product of the present invention can be used by itself as a patch for various materials and can also be used in combination with molding compounds such as bulk molding compounds, sheet molding compound, thick molding compound and high glass reinforcement molding compounds, such as HMC ® composites and XMC ® composites and filament wound materials. When the tape product of the present invention is used with various molding compounds, it can be used on one or more surfaces of the molding compound and can even be used at any layer within the molding compound. When the tape product is used with bulk or sheet molding compound, the bulk or sheet molding compound is made by any method known to those skilled in the art and the tape product can be applied on the bottom surface or the top surface or both of the bulk or sheet molding compound or can be disposed within the bulk or sheet molding compound during the compound formation. With the impregnated mat maintaining the alignment of the high performance reinforcing strands while the tape is used with bulk or sheet molding compound, the alignment is maintained during forming and subsequent processing including molding.

The use of the impregnated mat in the tape product not only maintains alignment but also obviates any necessity for removing any substrate layer from the high performance reinforcing fibers in order to use the high performance reinforcing fibers with molding compounds in molding. In addition, the tape product can be applied to the molding compound at any time during its formation or subsequent to its formation by any known process for adding a sheet-like material to a molding compound before molding. This allows a degree of freedom of design in that one or more varied dimensioned segments of the tape of high performance fibers can be placed in a mold with molding compound to produce a molded article with increased reinforcement and strength at any desired location in the molded article. Such results are achieved with suitable conventional compression molding machines such as positive pressure molds, transfer molds and the like. The one or more segments of high performance fiberous tape product is placed in the mold at any desired location before with or after the addition of the molding compound to the mold. The mold is operated in the suitable, conventional manner to produce the molded article.

When the tape product is used with thermoplastic materials, it can be applied by any method known to those skilled in the art for applying a sheet material or sheet-like material to a reinforced or unreinforced thermoplastic polymer. One such example would be the method known to those skilled in the art for producing the AZDEL ® composite available from PPG Industries, Inc., Pittsburgh, Pa. More details about the method for producing this product are available in U.S. Pat. No. 3,915,681 (Ackley); U.S. Pat. No. 3,850,723 (Ackley); U.S. Pat. No. 3,684,645 (Temple et al); and, U.S. Pat. No. 3,621,092 (Hofer), all hereby incorporated by reference. In any of these methods, the tape product of the present invention can be added to the thermoplastic product at any time during production of a thermoplastic sheet product for molding or before molding by any method that would incorporate the tape product with the thermoplastic material or the glass reinforced thermoplastic material.

Figure 4:
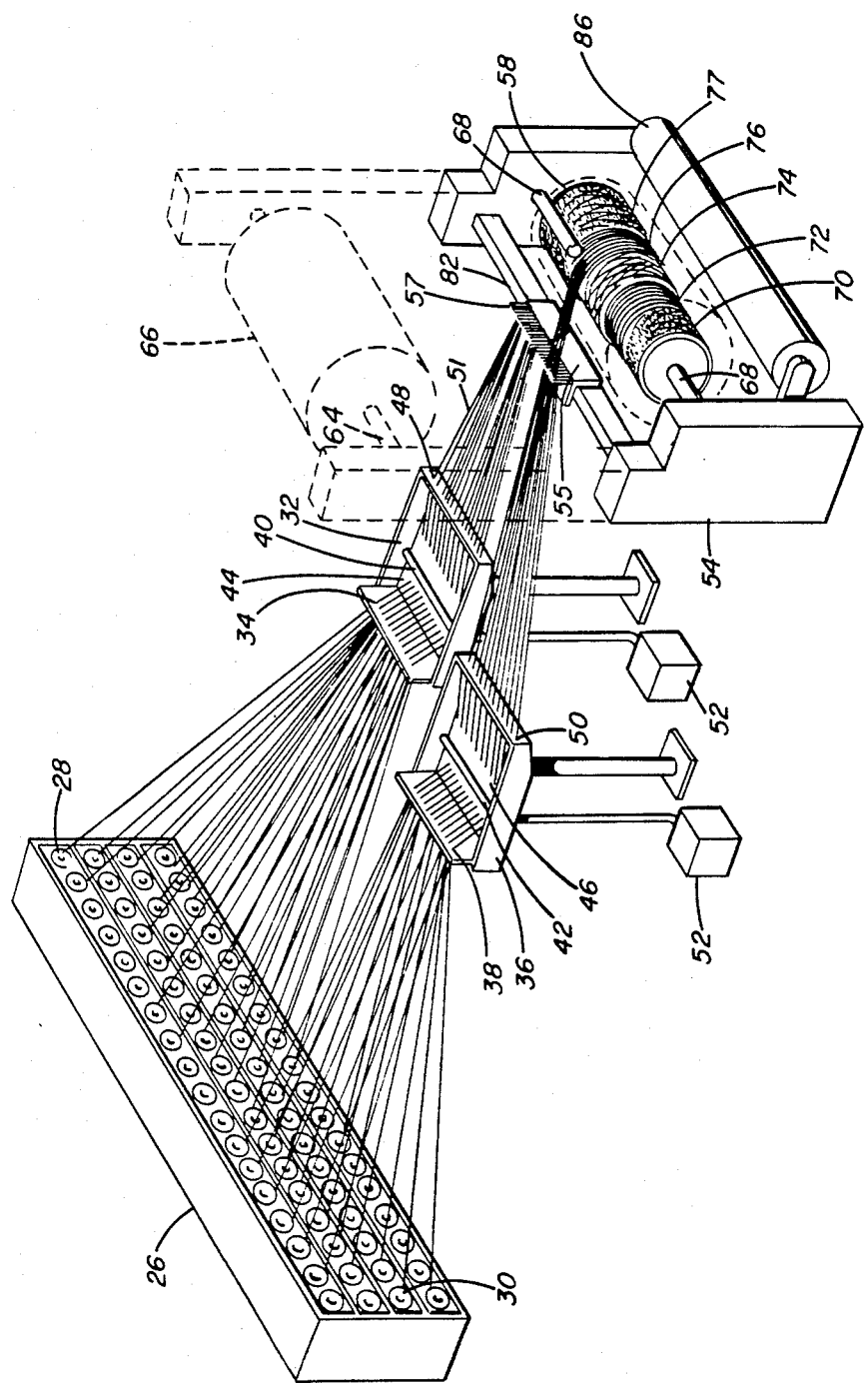
FIG. 4 is a somewhat schematic view in perspective of the apparatus and process for performing the present invention to produce a hybrid composite having an exterior layer of unidirectionally aligned high performance reinforcing fibers maintained in alignment by impregnated mat on the exterior surface of the tape of high performance reinforcing fibers.

Now referring to FIG. 4, there is shown the process and apparatus of the preferred embodiment of the present invention. The tape of high performance fibers is formed under tension in a filament winding process and the tape is combined with the molding compound in the filament winding process. Creel 26 contains packages of glass fiber strand 28, which may be forming packages or roving or bobbin packages and packages of high performance reinforcing continuous fiberous bundles, preferably carbon fibers, 30 for conveyance to one or more resin baths. The glass fiber strand packages are arranged such that the strands from the fiber glass strand packages may be withdrawn for feeding into the resin tank 32 through eyelets 34 preferably so that each strand has a separate eyelet. The carbon fibers are withdrawn from packages 30 and preferably, each fiber is conveyed through a separate eyelet 38 into resin tank 36. The set of eyelets 34 and 38 are located at one end of each respective resin tank 32 or 36. It is preferred to use ceramic eyelets for feeding each strand from the packages of glass fiber strand and of carbon fibers from creel 26.

In an alternative embodiment, the carbon fibers and glass fiber strands could be conveyed through the same set of eyelets preferably one eyelet for each fiber or strand and into one resin bath. This alternative embodiment is a more favorable approach when small quantities of the hybrid composite are being made. There are more process advantages to using a separate set of eyelets and a separate resin tank for the carbon fibers and glass strands. Such operation allows for facile cleaning of one or the other resin tank and allows for easy usage of different resins, one for the carbon fibers and a different one for the glass fiber strands.

In FIG. 4, the glass fiber strands, after entering the bath through the set of ceramic guide eyes 34, are drawn under the surface of the resin bath and kept submerged for a good portion of their passage through the bath by bars such as bar 40. The bath is formed in the resin tanks having the inlet set of guide eyes 34 and 38 and also having guide bars 40 and 42, respectively for resin tank 32 and 36. The resins in resin tanks 32 and 36, can be the same or different resins as long as they are compatible with each other and with any matrix polymer. The resin comprising the resin bath in both resin tanks 32 and 36, can be any of the aforementioned polymers or resin systems in the discussion of FIG. 2. The glass fiber strands are pulled through resin bath 44 by the pulling force exerted by the rotation of mandrel, 58. The same is also true for the carbon fibers entering resin bath 36 through set of eyelets, 38. These are pulled through the resin, 46, by the rotation of mandrel 58 and immersed in the bath by guide bar, 42. The set of exit orifices 48 for resin tank 32 and exit orifices 50 for resin tank 36 are regulated to close tolerances to meter a measured predetermined amount of resin onto each of the glass fiber strands and carbon fibers. The level of resin in both resin tanks is controlled by one or separate level regulating means, not shown, which regulates the addition of the bath components from the source of resin generally indicated as 52.

After leaving the resin tank 32, the glass fiber strands now coated with uncured resin are conveyed to the winder generally indicated by housing 54. The glass fiber strands are led to the traversing carriage 55 on which is mounted a strand spacer bar 57 having slots 56 with predetermined spacing. The precise spacing on spacer bar 57 of traversing carriage 55 is important to ensure that the strands are at the proper spacing such that the helical winder will lay or rest strands of successive layers precisely in the spaces between the strands of those layers previously wound. The rotational speed of the drum 58 is controlled by selection at the winder control, not shown. Changing the machine settings allows various helix angle variation.

Carbon fibers 30 to be wound onto the mandrel exit resin tank 36 through set of eyelets 50 and travel to spacer bar 57 on the traversing carriage 55 at the closest extreme of the spacer bar. The carbon fibers can be laid on the mandrel either as a group of carbon fibers or gathered together by a gathering device (not shown), but like that shown in FIG. 2, and laid onto the drum as a single bundle of strands. The carbon fibers can be placed on mandrel 58 through one portion of spacer bar 57 either before or after or during the winding of the glass fiber strands. It is within the scope of the present invention to use separate spacer bars, or gathering means or disposing means for the high performance fibers and glass fiber strands or other fibers of lower performance characteristics than carbon fibers. In using one spacer bar apparatus having both the high performance fibers at one end and the glass fiber strands at another end, the fibers or strands not being placed on the mandrel, while the other fibers or strands are being placed on the mandrel, are held or tied off on the spacer bar. Therefore, these tied off fibers and/or strands merely reciprocate back and forth with the reciprocating motion of the spacer bar 57.

Before either the glass fiber strands or carbon fibers are wound onto the mandrel, it is preferred to place a layer of polymeric film (not shown) about the entire circumference of the mandrel. The polymeric film can be any type as aforementioned in the discussion of FIG. 2 and can be supplied from any source. It is convenient to have a source located in the proximity of the winder drum for facile application of the film to the mandrel. Such a source is shown as at 86.

After the polymeric film is applied to cover the surface of the mandrel, an amount of matrix compatible polymer that is also compatible with the resin or resins in resin baths 44 and 46 is applied to the mandrel as it rotates. This application of polymer can be before or simultaneously with the placement of the mat to be impregnated, 70, on the mandrel. The amount of polymer is a sufficient amount to wet-out or effectively saturate a substantial portion of the mat.

After the polymer is applied to the mandrel with the polymeric film (not shown), a mat, preferably, one comprised of continuous monofilament glass fibers, is applied to the polymeric matierial. An example of the continuous monofilament glass fiber mat useful in the present invention is that available under the trade designation "Modiglass", from Reichhold Chemicals, Inc., Bremen, Ohio. The mat can be of any thickness of less than about 0.05 inches (0.13 cm.), although it is preferred to use the Modiglass mat that has a thickness of 0.010 inches (0.025 cm.). It is convenient to have the mat located in proximity to drum 58. This mat in unimpregnated or preimpregnated form can be located at roll 66 which can be located above or below or otherwise in proximity to drum 58 as on spindle 64. The mat on spindle 64 is pulled down onto the mandrel, which has polymeric film (not shown) covering the mandrel. Mat 66 is disposed on the mandrel, the mat is further impregnated with the matrix compatible polymer by rolling the mat into the polymer with a roller like roller 68. Generally, the impregnated mat can be formed by any process known to those skilled in the art for applying a polymer to a relatively thin, lightweight glass fiber mat. The impregnated mat, having the rolled in polymer may have additional resin, if needed, metered onto the impregnated mat as it rotates on the mandrel.

The material on mandrel 58 is shown in a stratified view showing the impregnated mat 70 which is covering the polymeric film covering the length of the mandrel, and carbon fibers 72 and one or more layers of glass fiber strand 74, the other layer of carbon fibers 76 and another layer of impregnated mat 77. The dotted lines indicate the finish product in an unstratified view on the mandrel. Each layer of the depicted in the stratified view run the entire length parallel to the axis of rotation of the mandrel. The carbon fiber strands are preferably wound in side-by-side parallel arrangement onto the mandrel from traversing device 55 and spacer bar 57 as the mandrel rotates preferably in a forward direction so the fibers and strands contact the top of the mandrel. The winding of the carbon fibers to provide this movement from the creel, through the resin bath and through the dies onto the mandrel develops the tension needed to initially align the carbon fibers. This alignment is locked in by the carbon fibers contacting the impregnated mat. Either without or after the winding of at least one layer of carbon fibers on the impregnated mat, the reinforcing glass fiber strands are wound on the mandrel. The reinforcing glass fiber strands are indicated in the stratified view as 74 as several layers of helically wound strand.

In addition to the glass fiber reinforcing strand, chopped glass fiber strands or swirled glass fiber strands, can be placed on the mandrel according to the methods shown in U.S. Pat. Nos. 4,220,496 and 4,220,497 which have been incorporated by reference.

After the desired layers of glass fiber reinforcing strand have been wound in the helical fashion, although the glass strands can be wound in any manner known to those skilled in the art, a covering of the polymeric film (not shown) is placed over the composite if the composite is not to be covered with the tape product of the present invention. If another surface of the carbon fiber tape of the present invention is to be placed on the composite, as it preferably is, one or more additional layers of the carbon fibers are formed by winding the carbon fibers from reciprocating spacer bar 57 through traversing device 55 onto the glass fiber material on the mandrel. Again, it is preferred to have the carbon fibers in side-by-side parallel arrangement. On top of the one or more layers of continuous carbon fibers, there is placed one or more layers of the impregnated mat, or another sufficient amount of polymer into which the mat is deposited on the mandrel. If the polymer is deposited on the glass fiber strand layers, the mat is rolled into the polymer. The section of mat or preimpregnated mat is pulled from roll 66, placed under roller 68, and wound onto the mandrel preferably in a clockwise direction. The mandrel can be rotated several times with the pressure roller applied to the impregnated mat to assure that the mat is sufficiently wet-out or to initially wet-out the mat in the polymer present on the mandrel. If additional polymer needs to be added, it can be metered onto the surface of the polymer impregnated mat by a metering device known to those skilled in the art. When the impregnated mat is placed on the mandrel, a cutting device, known to those skilled in the art, can be used to cut the preimpregnated mat. The cutting device (not shown) can be located just underneath roll 66.

After the molding composite on the mandrel is covered with the layer of polymeric film, the composite is cut from the mandrel in a line parallel to the axis of rotation of the mandrel. The polymeric film placed on the mandrel surface and on the final composite is supplied preferably from a roller of polymer film, located underneath the mandrel at 86. After the composite is removed from the mandrel, the resin system of the composite is allowed to thicken to the desired molding viscosity. Preferably, this aging is done while the composite is in a flat state. Such aging can occur in as little time as 30 minutes to as long as several days. The composite produced can be used in molding applications like compression molding applications.

The process generally depicted in the drawing, FIG. 4, is obviously subject to many variables. Thus, while it is shown the glass fiber strands from the creel enter the resin tank on the right and the carbon fibers from the creel, 26, enter the resin tank on the left, the carbon fibers and the glass fiber strands can be situated in any fashion in creel 26 to allow the respective strands and fibers to travel to their respective resin tank or section of one resin tank. Also, instead of forming the impregnated mat directly by spraying, metering or handling, the mat can be preimpregnated by any suitable method known to those skilled in the art impregnating mats with polymers. In this case, the roll of mat at 66 is the mat preimpregnated with polymer or resin. The preimpregnated mat is placed either on the polymeric film on the mandrel surface or on the side-by-side parallel arranged carbon fiber strands that can be present on the mandrel. The preimpregnated mat can be added with or without the separate addition of an amount of matrix compatible polymer being placed on the mandrel. When the impregnated mat is formed on the mandrel, the sufficient amount of matrix compatible polymer can be added to the mandrel in several additions. A first addition that is less than that effective amount and a second polymer addition made to the mat after the mat is applied to a surface on the mandrel. The second addition would then make the total resin used in conjunction with the mat an effective amount of polymer. When the impregnated mat is formed on the mandrel, either for the bottom surface and/or top surface of the composite, the roller 68 is used to roll the polymer into the mat. In addition, roller 68 can be removed and handheld rollers can be used. Another variation of the process is to have polymer impregnated mat upon both surfaces of the carbon fibers that are arranged in side-by-side parallel relationship. Another variation is to reverse the location of the mat or preimpregnated mat at 66 with the polymeric film at 86 since the exact location of either is not critical as long as they are located close to the mandrel. Another variation is that the glass fiber strand continuous reinforcing strand can be a composite strand of glass fiber and a high performance reinforcing fiber strand.

In the process shown in the drawing, the mandrel 58 is rotating in a forward direction, as earlier explained, on a shaft, 68, which is driven by a suitable motor. The spacer bar 57 reciprocates in a horizontal plane on any suitable conventional apparatus, like rail 69 with any suitable conventional reciprocating drive apparatus and lays the respective strand down on the mandrel 58. The glass fiber strand is preferably laid on the mandrel 58 at a predetermined helix angle to provide directional reinforcement properties to the finished sheet. The helix angle is the included acute angle created by the intersection of the strand or strands 51 exiting the spacer bar 57 and placed on the body of the mandrel 58 with a line on the body of the mandrel parallel to the longitudinal axis of the mandrel. This angle for the structural sheets produced by this process is generally in the range of about 60 to about 89 degrees. The wind angle of the mandrel in relation to the glass fiber strands 51 is the included acute angle created by the intersection of the strand or strands 51 on the body of the mandrel 58 with a line on the body of the mandrel perpendicular to the longitudinal axis of the mandrel. In a typical use of the process, this angle is between about 30 to about 1 degrees.

In the normal operation of mandrel 58 winding the glass fiber reinforcing continuous strands, the mandrel rotates continuously during the process and the spacer bars 57 reciprocate in a horizontal plane causing the strand or strands 51 to be laid down on the mandrel 58 in a criss-cross fashion to form layers of composite on the surface of the polymeric film on the mandrel or on the carbon fiber layer on the mandrel or on the carbon fiber layer on top of the impregnated mat at present on the mandrel.

Another important consideration in preparing the composites is the regulation of the resin content of the final product. In this process, this is accomplished by regulating the size of the orifice in each die in the set of dies at 48 and 50. In general, it has been found desirable to maintain these orifices in the range of 0.014 to 0.125 inches.

The carbon fibers and glass fiber strands can be fed to the system and wound on the mandrel at speeds ranging from between about 50 to about 500 feet per minute. The composites produced in this process on a volume basis generally contain about 5 to about 90 percent reinforcement and about 15 to about 50 percent polymer. The amount of reinforcement can be blended in any ratio between glass fiber strand and carbon fibers to achieve desired modulus properties in the product. The amount of reinforcement generally has about 1 to about 50 percent carbon fibers with the remainder being glass fiber strand, but for economic reasons, the amount of carbon fibers is usually less than the amount of glass fiber strand. Preferably the ratio of reinforcement is about 5 to about 25 percent carbon fiber to about 75 to about 95 percent glass fiber strand on a volume basis.

Figure 5:
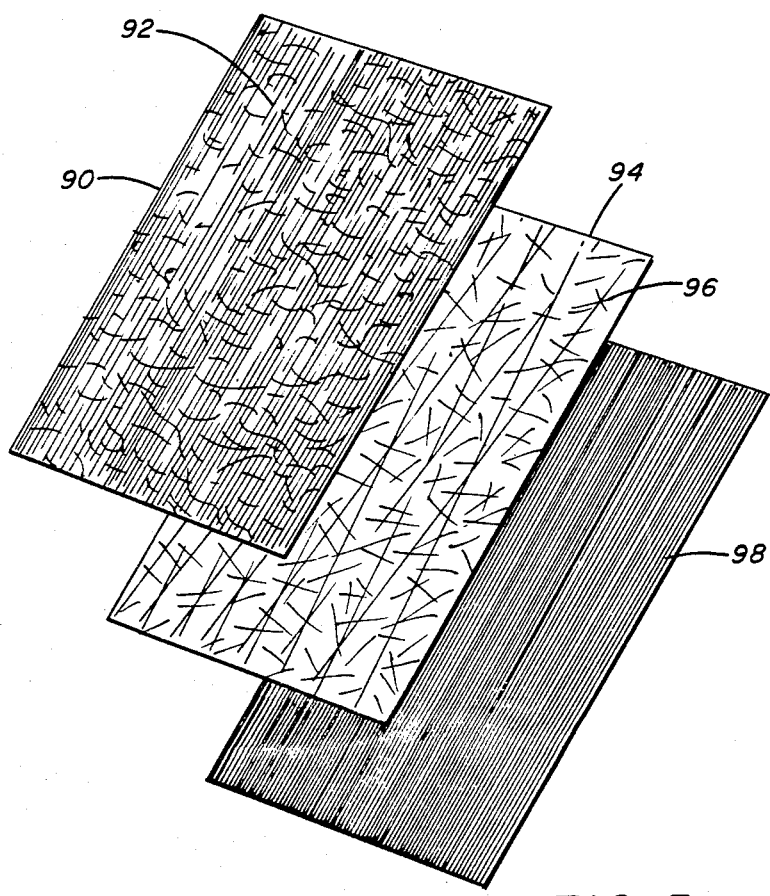
FIG. 5 is an exploded view of the layered hybrid composite having a layer of high performance fibers with impregnated mat on each surface of the intermediate layer of lower performance fiber and polymeric matrix.

FIG. 5 is an illustration of the composite having the carbon tape of the present invention with the impregnated mat and one or more layers of continuous glass fiber reinforcement and another layer of carbon tape. In FIG. 5, the impregnated mat is indicated by numerals 92 where the mat has been impregnated with a matrix compatible polymer and is on the top surface of the parallel carbon fibers 90. The aligned side-by-side parallel carbon fibers are indicated by numerals 90 and 98 in the top and bottom layers respectively, of the composite. The helically wound continuous glass fiber strand reinforcement is indicated by numeral 94 also having chopped strands 96. Such a composite can be molded into numerous shapes, where the carbon fibers will substantially maintain their parallel alignment throughout the molding process into the molded product.

In the preferred embodiment of the present invention, this article has as the polymer a conventional molding compound type polyester resin system and the carbon tape product is used on the exterior surfaces of an XMC ® composite, wherein the impregnated mat is on the exterior surface of the aligned carbon fiber strands.

EXAMPLE 1

In a typical application of the present process, a resin-glass tape composite was made by filling the resin pan with a resin mixture containing 90 parts of isophthalic polyester resin, 10 parts styrene monomer, 0.5 parts of a zinc stearate, 1 part tertiary butyl perbenzoate, and 3.5 parts of a magnesium oxide thickener.

Twelve glass fiber strand forming packages were mounted on a creel, each of the packages containing K-15 glass fiber strands. These strands have 1000 glass filaments, each filament having a diameter of 0.0005 inches. These glass fiber strands were introduced into the resin pan at a continuous rate of around 300 feet per minute. The resin pan containing the resin mixture referred to above was maintained constantly with resin during the run. The glass fiber strands passing through the resin pan were withdrawn through the precision dies, each having a diameter of 0.045 inches.

Six carbon fiber strand packages were fed into the system by passing each of the carbon fiber strand into a separate resin bath at a continuous rate of about 300 feet per minute. The carbon fiber strands were then removed from the bath through the precision dies and advanced to the spacer bar of the traverse mechanism.

A nylon film was placed on the mandrel and an amount of the same polymer system used in the resin bath was applied to the polymer film on the mandrel. A mat of continuous glass fiber monofilaments having a thickness of 0.10 inches was placed on the polymer and rolled into the polymer. An additional amount of polymer was then placed on the mat and rolled into the mat to the impregnated mat. The mandrel was then started and the carbon fibers gathered into a bundle of fibers which was wound onto the impregnated glass mat in side-by-side parallel abutting alignment for one layer across the mandrel. In passing through the die, the excess resin was wiped from the carbon fibers. With the one layer of carbon fibers on the mandrel, glass fiber strands gathered into one bundle were wound on the surface of the mandrel in side-by-side relationship at a helix angle of 85.4° and a wind angle of 4.6°. The reciprocating guide was passed back and forth above the surface of the mandrel and the continuous glass fiber strand bundle was wound thereon until three layers were laid on the mandrel surface. Then a nylon film was placed over the surface and the mandrel was stopped and the carbon glass mat impregnated tape, glass strand composite was removed. The finished sheet was cut for molding flat panels. The panels were molded from these blanks on a press and formed satisfactory structural panels having exterior surfaces of impregnated mat and substantially parallel aligned side-by-side carbon fiber strands.

While the invention has been described with references to certain specific embodiments, it is not intended to be limited thereby except insofar as it appears in the accompanying claims.

I claim:

1. A method of producing a tape of aligned continuous high performance reinforcing fiber, comprising:
   preparing a fiberous mat having a thickness in the range of about 0.01 to about 0.05 inch impregnated with an effective amount of a matrix compatible polymer, coating one or more continuous high performance reinforcing fibers over a substantial portion of their surface with a matrix compatible polymer to thoroughly wet the fibers, contacting the one or more coated continuous reinforcing high performance fibers under tension in the form of one or more layers, wherein the fibers are in a unidirectional orientation in each layer, with the impregnated mat to form a tape, and releasing the tension of the tape.

2. Method of claim 1, wherein the contacting of the impregnated mat and the one or more continuous high performance reinforcing fibers is performed by filament winding, where the impregnated mat is placed on the mandrel having a polymeric film on its surface and continuous high performance fibers are wound onto the impregnated mat by the rotating mandrel until at least more than one length of the high performance fiber is disposed as a layer on the impregnated mat.

3. The method of claim 2, wherein the impregnated fibrous mat is prepared by placing an effective amount of the matrix compatible polymer of the polymeric film on the mandrel, applying the fibrous mat to be impregnated to the polymer and applying a second effective amount of the matrix compatible polymer to the mat.

4. The method of claim 2, wherein the preparation is performed by placing an impregnated mat on the mandrel having a polymeric film on its surface and simultaneously adding a small amount of matrix compatible polymer to the impregnated mat.

5. Method of claim 3, wherein the first effective amount of matrix compatible polymer, mat and second effective amount of matrix compatible polymer are added to a layer of continuous high performance reinforcing fibers present on the mandrel.

6. Method of claim 1, wherein the high performance reinforcing fibers are longitudinally aligned in the layers.

7. Method of claim 1, wherein the high performance reinforcing fibers are in near parallel alignment in the one or more layers.

8. Method of claim 1, wherein the high performance reinforcing fibers are in side-by-side near parallel alignment.

9. Method of claim 1, wherein the high performance reinforcing fibers have a controlled spacing between them in the one or more layers.

10. Method of claim 1, wherein the impregnated mat is contacted with the high performance continuous reinforcing fibers in a layer which extends across the mandrel.

11. Method of claim 4 or 5, wherein the second effective amount of polymer is rolled into the mat.

12. Method of claim 1, wherein the mat is selected from the group consisting of glass, organic or high performance fibrous continuous monofilament mat, continuous fine diameter fibrous mat, and chopped strand paper mat, and chopped short length strand mat.

13. Method of claim 1, wherein the high performance reinforcing fibers are selected from the group consisting of carbon fibers, graphite fibers, aramid fibers, and other fibers having a Young's modulus greater than about $14 \times 10^6$ psi.

14. Method of claim 1, wherein the contacting is performed by filament winding where the one or more layers of the high performance reinforcing fibers are wound onto the mandrel having a polymer film on its surface and the impregnated fibrous mat is placed on the wound fibers.

15. The method of claim 14, wherein the layers on the mandrel can be in the same direction or in different directions from layer to layer.

16. Method of claim 1, wherein the tape product is combined with molding compounds.

17. Method of claim 1, wherein the mat has a weight up to one ounce per square foot (0.03 gm (cm$^2$).

18. Method of claim 1, wherein the matrix compatible polymer is selected from the group consisting of: saturated and unsaturated polyesters, 1,2- and 1,3-epoxies, vinyl esters, with or without the addition of styrene or vinyl monomer, polybutylene terephthalate, polysulfone, polyester sulfone, nylon, polyphenylene sulfide and polyamide-imide.

19. Method of claim 1, wherein the coating on the one or more continuous high performance reinforcing fibers is applied by dye coating wherein the one or more dye orifices are set at about 0.014 to about 0.11 inch (0.036–0.28 cm).

20. Method of claim 1, wherein the matrix compatible polymer is the matrix molding compound.

21. Method of claim 1, wherein the matrix compatible polymer impregnating the fibrous mat and present on the one or more continuous high performance reinforcing fibers gives a total amount of matrix compatible polymer in the tape in the range of about 1 to about 20 weight percent of the tape.

22. Method of claim 1, wherein the matrix compatible polymer in the tape product is a curable thermosetting matrix compatible polymer or a softened thermoplastic matrix compatible polymer.

23. An improved high performance continuous reinforcing fibrous tape product, which maintains substantially the alignment of the high performance fibrous reinforcement in the tape during molding, comprising:

a layer of fibrous mat having a thickness in the range of about 0.01 to about 0.05 inch, a matrix compatible polymer impregnating the fibrous mat, and more than one length of continuous high performance reinforcing fibers coated over a substantial portion of their surfaces with a matrix compatible polymer to thoroughly wet the fibers, where the fibers form one or more layers in which the fibers have a unidirectional orientation in each layer and where the fibers contact the fibrous mat.

24. Article of claim 23, wherein the mat is selected from the group consisting of glass fiberous, organic fiberous, or high performance fiberous continuous monofilament mat; chopped strand paper mat, and fine diameter continuous multifilament mat, and chopped short length strand mat.

25. Article of claim 23, wherein the matrix compatible polymer is selected from the group consisting of: saturated and unsaturated polyesters, 1,2- and 1,3-epoxies, vinyl esters, with or without the addition of styrene or vinyl monomer, polybutylene terephthalate, polysulfone, polyester sulfone, nylon, polyphenylene sulfide and polyamide-imide.

26. Article of claim 23, wherein the high performance reinforcing fibrous strand is selected from the group consisting of carbon, graphite, aramid, boron, and silicon carbide strands and other strands having a Young's modulus greater than about $14 \times 10^6$ psi.

27. Article of claim 24, wherein the mat is present in an amount of about 1 to about 35 weight percent of the article.

28. Article of claim 25, wherein the amount of resin is present in an amount of about 1 to about 20 weight percent of the article.

29. Article of claim 26, wherein the amount of high performance reinforcing fiber is present in an amount of about 5 to about 85 weight percent of the article.

30. Article of claim 23 contacting molding compounds selected from the group consisting of sheet molding compounds, high reinforcement content molding compounds, filament wound molding compounds, thick molding compounds and bulk molding compounds.

31. Article of claim 23, wherein the high performance reinforcing fiber strands are in side-by-side near parallel alignment.

32. Article of claim 23, wherein the high performance reinforcing strands have controlled spacing between the strands in the layers.

33. Tape product of claim 23, wherein the matrix compatible polymer is the matrix molding polymeric compound.

34. Tape product of claim 23, wherein the total amount of the matrix compatible polymer present in the impregnated fibrous mat and with the one or more continuous high performance reinforcing fibers is an amount in the range of about 1 to about 20 weight percent of the tape product.

35. Tape product of claim 23 having cured thermosetting matrix compatible polymer or a hardened thermoplastic matrix compatible polymer.

36. Method of preparing a molding compound with high performance reinforcing fibers by filament winding, comprising:
  (a) placing a polymeric film on the mandrel of a filament winding apparatus to assure release of the material from the mandrel,
  (b) applying to the mandrel an effective amount of a matrix compatible polymer,
  (c) applying to the polymer on the mandrel a fibrous mat having a thickness in the range of about 0.01 inch to about 0.05 inch (0.025–0.13 cm),
  (d) rolling the mat in the polymer to impregnate the mat with the polymer,
  (e) rotating the mandrel to wind one or more layers of one or more high performance reinforcing fibers,
  (f) rotating the mandrel to wind on top of the layer of high performance fiber one or more layers of reinforcing fibrous strand, coated with matrix compatible polymer, and
  (g) removing the polymer impregnated mat, high performance fiber layer or layers and reinforcing fibrous strand layer or layers as a molding compound with a polymeric film covering.

37. Method of claim 36 which includes placing a second application of matrix compatible polymer on the last layer of reinforcing fibrous strand, and placing a second mat on the second application of polymer, and rolling the mat into the polymer to saturate the fibrous mat.

38. Method of claim 36 or 37 which includes:
  rotating the mandrel to wind a second application of one or more layers of high performance fibers onto one or more layers of general reinforcing fibrous strand,
  applying to the last layer of high performance fiber another application of an effective amount of matrix compatible polymer, and
  rolling into the effective amount of polymer another fibrous mat to saturate the mat with the polymer.

39. Method of claim 36 or 38, wherein a polymeric film is applied to the top layer of the molding compound.

40. Method of claim 36 or 38, wherein the high performance reinforcing fiber or fibers are coated with matrix compatible polymer before being wound on the mandrel.

41. Method of claim 36 or 38, wherein the general reinforcing fibrous strand is wound in a helical pattern on the mandrel.

42. Method of claims 36 or 38, wherein the general reinforcing fibrous strands are glass fiber strands.

43. A molding compound, comprising:
  (a) a fibrous mat,
  (b) an effective amount of matrix compatible polymer impregnating the mat, where the mat impregnated with the matrix compatible polymer is suitable for contacting with high performance reinforcing fibers,
  (c) one or more high performance continuous reinforcing fibers in the form of one or more layers with a layer in contact with the impregnated mat, whereby the high performance reinforcing fibers have improved alignment,
  (d) one or more layers of general reinforcing mat selected from filament wound reinforcing fibrous strand, continuous strand mat chopped strand mat high glass reinforcement and woven strand mat, contacting the last layer of high performance continuous reinforcing fibers, and
  (e) matrix polymer for the one or more layers of general reinforcing mats selected from saturated and unsaturated polyesters, 1,2- and 1,3-epoxy polymers and vinyl esterpolymers, polybutylene terephthalate, polysulfone, polyether sulfone, nylon, polyphenylene sulfide and polyamide-imide forming molding compounds with the general reinforcing mat selected from the group consisting of bulk molding compounds, sheet molding compounds, high glass reinforcing molding compounds and thick molding compounds.

44. Molding compound of claim 43, wherein the fibrous mat is selected from the group consisting of a glass fiberous, organic fiberous or high performance fiberous continuous monofilament mat; or chopped glass fiber strand mat or chopped strand paper mat; or fine diameter continuous multifilament mat; or chopped short length strand mat.

45. Molding compound of claim 43 or 44, wherein the fibrous mat has a thickness in the range of about 0.01 inch to about 0.05 inch (0.025–0.13 cm).

46. Molding compound of claim 43, wherein the matrix compatible polymer is selected from general polyester polymers, 1,2- and 1,3-epoxy polymers and vinyl ester polymers.

47. Molding compound of claim 43, wherein the high performance reinforcing fiber is carbon, or graphite fibers or mixture thereof.

48. A molding compound, comprising:
  (a) a fibrous mat having a thickness in the range of about 0.01 to about 0.05 inch and a weight up to one ounce per square foot (0.03 grams/cm$^2$) wherein the fibrous material in the mat is one or more continuous monofilaments selected from the group consisting of glass fibers, organic fibers, or high performance fibers, (b) an effective amount of matrix compatible polymer impregnating the mat, wherein the mat impregnated with the matrix compatible polymer is suitable for contacting with high performance reinforcing fibers,
(c) one or more high performance continuous reinforcing fibers in the form of one or more layers with a layer in contact with the impregnated mat, wherein the one or more high performance continuous reinforcing fibers have a coating of the matrix compatible polymer on a substantial portion of their surfaces to thoroughly wet the fibers, and where the fibers are present in a unidirectional orientation in each layer, and wherein the amount of the continuous monofilament fiberous mat that is present is in the range of about 1 to about 35 weight percent of the fiberous mat plus the matrix compatible polymer of (b), and plus the high performance continuous reinforcing fibers of (c), and where the amount of the high performance reinforcing continuous fibers is about 5 to about 85 weight percent of the monofilament fiberous mat plus matrix compatible polymer of (b), and high performance fibers of (c), and where the matrix compatible polymer is present in an amount of about 1 to about 20 weight percent of the monofilament mat of (a), plus the matrix compatible polymer of (b) and the high performance continuous fibers of (c),
(d) one or more layers of molding compound selected from the group consisting of bulk molding compounds, sheet molding compounds and high glass reinforcement molding compounds and filament wound molding materials formed from one or more layers of general reinforcing mat selected from filament wound reinforcing fiberous strand, continuous strand mat, chopped strand mat, high glass reinforcement, and woven strand mat and a matrix polymer for the one or more layers of general reinforcing mats selected from saturated polyesters, unsaturated polyesters, 1,2- and 1,3-epoxy polymers, vinyl ester polymers, polybutylene terephthalate, polysulfone, polyether sulfone, nylon, polyphenylene sulfide and polyamideimide, wherein the molding compound contacts the last layer of high performance continuous reinforcing fibers,
(e) a fiberous mat having a thickness in the range of about 0.01 to about 0.05 inch and a weight up to one ounce per square foot (0.03 grams/cm$^2$) wherein the fiberous material in the mat is one or more continuous monofilaments of glass fibers, organic fibers, or high performance fibers that is in contact with the last layer of molding compound,
(f) an effective amount of matrix compatible polymer impregnating the mat of (e), wherein the mat impregnated with the matrix compatible polymer is suitable for contacting with high performance reinforcing fibers, and
(g) one or more high performance continuous reinforcing fibers in the form of one or more layers in contact with the impregnated mat, wherein the one or more high performance continuous reinforcing fibers have a coating of the matrix compatible polymer on a substantial portion of their surfaces to thoroughly wet the fibers, and where the fibers are present in a unidirectional orientation in each layer, and wherein the amount of continuous monofilament mat that is present is about 1 to about 35 weight percent of the mat of (e), the matrix compatible polymer of (f), and the high performance continuous reinforcing fibers of (g), and where the amount of the high performance reinforcing continuous fibers in the monofilament mat is about 5 to about 85 weight percent of the monofilament mat of (e), matrix compatible polymer of (f), and high performance fibers of (g) and where the matrix compatible polymer is present in an amount of about 1 to about 20 weight percent of the monofilament mat of (e), the matrix compatible polymer of (f) and the high performance continous fibers of (g).

49. Molding compound of claim 48, wherein the matrix compatible polymer is selected from general polyester polymers, 1,2- and 1,3-epoxy polymers and vinyl ester polymers.

50. Molding compound of claim 48, wherein the high performance reinforcing fiber is carbon, or graphite fibers or mixture thereof.

51. Method of producing a molded article with increased physical properties at desired locations in the article, comprising:
(a) placing in a compression mold a molding compound selected from sheet molding compound, high reinforcement content sheet molding compound, bulk molding compound, thick molding compound, filament wound molding compound or mixture thereof, or heated thermoplastic molding compounds,
(b) placing in the mold with the molding compound one or more segments of a tape of aligned high performance reinforcing fibers having attached to the fibers a fiberous mat which is impregnated with a matrix compatible polymer,
(c) arranging the segments of tape to be at the locations in the molding article, where the higher physical properties are desired, and
(d) activating the compression molding device to close to mold the article,
(e) activating the compression molding device to open, and
(f) recovering the molded article having high performance fiber reinforcement that is substantially aligned as the tape was placed in the mold at the desired location.

52. Method of claim 51, wherein the tape is a high performance continuous reinforcing fiberous tape product, which maintains substantially the alignment of the high performance fiberous reinforcement in the tape during molding, comprising: a layer of fiberous mat having a thickness in the range of about 0.01 to about 0.05 inch, a matrix compatible polymer impregnating the fiberous mat, and more than one length of continuous high performance reinforcing fibers coated over a substantial portion of their surface with a matrix compatible polymer to thoroughly wet the fibers where the fibers from one or more layers having the fibers in a unidirectional orientation in each layer, where a layer is in contact with the fiberous mat and matrix compatible polymer.

* * * * *